Patented July 12, 1932

1,866,775

UNITED STATES PATENT OFFICE

HERMANN OEHME, OF COLOGNE-KALK, GERMANY, ASSIGNOR TO CHEMISCHE FABRIK KALK, GESELLSCHAFT MIT BESCHRANKTER HAFTUNG, OF COLOGNE-KALK, GERMANY

PROCESS FOR THE PRODUCTION OF ZINC HYDROCARBONATE

No Drawing. Application filed August 8, 1929, Serial No. 384,519, and in Germany February 14, 1927.

It is well known that by precipitating solutions of zinc chloride with burnt lime zinc hydroxychloride is produced, which according to the conditions of precipitation contains more or less large quantities of fixed chlorine in a form insoluble in water. It has also been proposed to apply calcium or barium carbonate or an alkali metal carbonate as precipitating agent, but even in that case likewise zinc carbonate containing chlorine is produced. The precipitation with calcium carbonate proceeds only incompletely. The application of sodium carbonate for the same end is, of course, far more expensive than the use of burnt lime. Apart from that, it is necessary to use, in the employment of sodium carbonate as a precipitating agent for the zinc, at least one equivalent amount and even then a product is obtained, in which the zinc is precipitated as a carbonate, while a portion is still combined with chlorine.

The use of solutions of zinc sulphate as an initial product for the manufacture of zinc hydrocarbonate is also not suitable, since the solutions of zinc sulphate must be precipitated by soluble alkalies or alkali metal carbonates which yield no insoluble sulphates.

For specific uses, viz. for the production of a zinc hydrocarbonate or zinc oxide of very voluminous nature, both of which may be used in the vulcanization of caoutchouc with great advantage, it is profitable not to start from pure zinc carbonate, but to employ a zinc hydrocarbonate, in which a great portion of the zinc has the composition of a hydrate, whereas another portion is a carbonate, of the formula:

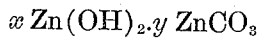

$$x\,Zn(OH)_2 . y\,ZnCO_3$$

It has been described to prepare such zinc hydrocarbonate which is free from chlorine from zinc oxychloride by treating the latter in aqueous suspension with gases containing carbon dioxide. The practical examination of that process has shown that although by those means a hydrocarbonate free from chlorine can be obtained, the carrying out of the process on a large scale offers great difficulties because the absorption of the carbon dioxide, especially when diluted with other gases by the zinc oxychloride, which is only slightly soluble in water, proceeds very slowly and incompletely. It is necessary to take great care to mix the suspension of zinc oxychloride with the gaseous carbon dioxide most thoroughly, which involves great expense for power and labor and the utilization of the carbon dioxide is even then very bad, unless the introduction of the gas takes place very slowly.

I have now found a method by which I can overcome all the technical difficulties of the process and can obtain a zinc hydrocarbonate free from chlorine and of excellent quality by treating zinc oxychloride in aqueous suspension with solutions or suspensions of alkali metal carbonate or bicarbonate. That process can be carried out far more simply on a large scale since it is done by agitating zinc oxychloride with a solution or suspension of an alkali metal carbonate. Strange to say, the carbonic acid when combined reacts much better than carbon dioxide introduced in the gaseous state.

I found that in the handbook of Gmelin-Kraut's Chemistry, Volume IV, Part I, page 47 it is stated that zinc oxychloride of the formula $9ZnO.1ZnCl_2$ cannot be completely freed from chlorine by boiling with a solution of potassium carbonate. It is not stated in what equivalent proportion the zinc oxychloride is used with the potassium carbonate and I assume that there must have been a great excess of potassium compared with the zinc in the oxychloride. At any rate, the publication does not disclose the application of only a very small excess of sodium bicarbonate over and above the equivalent amount of chlorine present and of a temperature below 100° C. Hereby a perfect splitting off of the chlorine can be attained. The temperature during the treatment should be kept below the boiling point as otherwise the carbon dioxide contained in the bicarbonate is likely to combine with zinc oxychloride. If the reaction mixture were heated to the boiling point from the beginning the carbon dioxide would prematurely escape and the zinc hydrocarbonate formed or the zinc oxide made herefrom would not be sufficiently voluminous.

It is obvious that the alkali metal carbonates can be replaced by alkali metal bicarbonates with equally good results.

Therefore the term carbonate, when used in the claims, is to be understood to include bicarbonates as well as carbonates proper.

Example 345 gr. of moist zinc oxychloride containing 154 gr. of zinc and 20 gr. of fixed chlorine are suspended in 1.6 litre of water containing 50 gr. of sodium carbonate. The mass is gradually warmed up to less than 90° C. and heated for 2 hours stirring all the time. The zinc hydrocarbonate formed, filtered and well washed tested only 0.028% of chlorine and the carbonic acid contained in the sodium carbonate was nearly quantitatively fixed in the zinc hydrocarbonate.

What I claim, is:—

1. The process of producing a highly voluminous zinc hydrocarbonate which consists in treating solid basic zinc chloride in aqueous suspension with a solution of an alkali metal carbonate at a temperature below 100° C.

2. The process of producing a highly voluminous zinc hydrocarbonate which consists in treating solid basic zinc chloride in aqueous suspension with a suspension of an alkali metal carbonate at a temperature below 100° C.

3. The process of producing a highly voluminous zinc hydrocarbonate which consists in treating an aqueous suspension of solid basic zinc chlorid with a solution containing an amount of alkali metal carbonate approximately equivalent to the amount of chlorin in the basic zinc chlorid, at a temperature above normal room temperature but below 100° C.

4. The process of producing a highly voluminous zinc hydrocarbonate which consists in treating an aqueous suspension of solid basic zinc chlorid with a solution containing an amount of alkali metal carbonate slightly in excess of that which would be equivalent to the amount of chlorin in the basic zinc chlorid, at a temperature above normal room temperature but below 100° C.

In testimony whereof I affix my signature.

HERMANN OEHME.